(12) United States Patent
Takahashi et al.

(10) Patent No.: US 8,671,264 B2
(45) Date of Patent: Mar. 11, 2014

(54) STORAGE CONTROL DEVICE AND STORAGE SYSTEM

(75) Inventors: Eisaku Takahashi, Kawasaki (JP); Teiji Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 705 days.

(21) Appl. No.: 12/871,308

(22) Filed: Aug. 30, 2010

(65) Prior Publication Data

US 2011/0055475 A1    Mar. 3, 2011

(30) Foreign Application Priority Data

Sep. 1, 2009   (JP) .................................. 2009-201597

(51) Int. Cl.
*G06F 12/00*   (2006.01)

(52) U.S. Cl.
USPC ............... 711/206; 711/4; 711/200; 711/202; 711/207; 711/220; 714/768

(58) Field of Classification Search
None
See application file for complete search history.

(56) References Cited

U.S. PATENT DOCUMENTS

| | | | | |
|---|---|---|---|---|
| 5,524,231 | A * | 6/1996 | Brown | 711/101 |
| 5,805,799 | A * | 9/1998 | Fredrickson et al. | 714/52 |
| 5,828,513 | A | 10/1998 | Greenberg | |
| 7,917,688 | B2 * | 3/2011 | Tanaka et al. | 711/103 |
| 2003/0140209 | A1 * | 7/2003 | Testardi | 711/203 |
| 2003/0204727 | A1 * | 10/2003 | Sasaki | 713/176 |
| 2005/0223154 | A1 * | 10/2005 | Uemura | 711/4 |
| 2006/0047872 | A1 | 3/2006 | Nakagawa et al. | |
| 2006/0129785 | A1 * | 6/2006 | Ripberger | 711/173 |
| 2007/0011402 | A1 * | 1/2007 | Sato et al. | 711/114 |
| 2008/0077753 | A1 * | 3/2008 | Yoshida | 711/154 |
| 2011/0007588 | A1 * | 1/2011 | Li et al. | 365/200 |

FOREIGN PATENT DOCUMENTS

| | | |
|---|---|---|
| JP | 9-223366 | 8/1997 |
| JP | 2003-228925 | 8/2003 |
| JP | 2006-72435 | 3/2006 |

* cited by examiner

*Primary Examiner* — Alford W. Kindred
*Assistant Examiner* — Ramon A Mercado
(74) *Attorney, Agent, or Firm* — Staas & Halsey LLP (57) ABSTRACT

A storage control device for controlling the storage device including a medium for storing data, logical address information, and address translation information and a memory for storing the address translation information read from the medium includes a first receiver for receiving a write request including logical address information, a first sending module for sending a read request including the logical address information of the write request to the storage device, a second receiver for receiving data and logical address information stored in the medium in accordance with the read request from the storage device, and a second sending module for sending an instruction to cause the storage device to write the address translation information stored in the medium into the memory when the logical address information received by the second receiver is different from logical address information included in the write request.

8 Claims, 11 Drawing Sheets

| LBA:0 | LBA:1 | LBA:2 | LBA:3 | DEFECT 1 | LBA:4 | ... | LBA:8 |
|---|---|---|---|---|---|---|---|
| C:0,H:0,S:0 | C:0,H:0,S:1 | C:0,H:0,S:2 | C:0,H:0,S:3 | C:0,H:0,S:4 | C:0,H:0,S:5 | C:0,H:0,S:... | C:0,H:0,S:9 |
| LBA:9 | LBA:10 | LBA:11 | LBA:12 | LBA:13 | LBA:14 | | LBA:18 |
| C:0,H:1,S:0 | C:0,H:1,S:1 | C:0,H:1,S:2 | C:0,H:1,S:3 | C:0,H:1,S:4 | C:0,H:1,S:5 | C:0,H:1,S:... | C:0,H:1,S:9 |
| LBA:19 | LBA:20 | LBA:21 | LBA:22 | LBA:23 | LBA:24 | | LBA:28 |
| C:0,H:2,S:0 | C:0,H:2,S:1 | C:0,H:2,S:2 | C:0,H:2,S:3 | C:0,H:2,S:4 | C:0,H:2,S:5 | C:0,H:2,S:... | C:0,H:2,S:9 |
| LBA:29 | LBA:30 | LBA:31 | LBA:32 | LBA:33 | LBA:34 | | LBA:38 |
| C:0,H:3,S:0 | C:0,H:3,S:1 | C:0,H:3,S:2 | C:0,H:3,S:3 | C:0,H:3,S:4 | C:0,H:3,S:5 | C:0,H:3,S:... | C:0,H:3,S:9 |
| LBA:39 | LBA:40 | LBA:41 | LBA:42 | LBA:43 | LBA:44 | | LBA:48 |
| C:1,H:0,S:0 | C:1,H:0,S:1 | C:1,H:0,S:2 | C:1,H:0,S:3 | C:1,H:0,S:4 | C:1,H:0,S:5 | C:1,H:0,S:... | C:1,H:0,S:9 |

...

| LBA:3989 | LBA:3990 | ... | LBA:3995 | LBA:3996 | BACKUP 1 | BACKUP 2 |
|---|---|---|---|---|---|---|
| C:99,H:3,S:0 | C:99,H:3,S:1 | C:99,H:3,S:... | C:99,H:3,S:6 | C:99,H:3,S:7 | C:99,H:3,S:8 | C:99,H:3,S:9 |

FIG. 5

[NORMAL STATE]

| LBA:0 | LBA:1 | LBA:2 | LBA:3 | DEFECT | LBA:4 | LBA:5 | LBA:6 |
|---|---|---|---|---|---|---|---|
| C:0,H:0,S:0 (U0) | C:0,H:0,S:1 (U1) | C:0,H:0,S:2 (U2) | C:0,H:0,S:3 (U3) | C:0,H:0,S:4 (−) | C:0,H:0,S:5 (U4) | C:0,H:0,S:6 (U5) | C:0,H:0,S:7 (U6) |

↔ DEFECT POSITION ON MEDIUM

[ABNORMAL STATE]

| DEFECT | LBA:0 | LBA:1 | LBA:2 | LBA:3 | LBA:4 | LBA:5 | LBA:6 |
|---|---|---|---|---|---|---|---|
| C:0,H:0,S:0 (U0) | C:0,H:0,S:1 (U1) | C:0,H:0,S:2 (U2) | C:0,H:0,S:3 (U3) | C:0,H:0,S:4 (−) | C:0,H:0,S:5 (U4) | C:0,H:0,S:6 (U5) | C:0,H:0,S:7 (U6) |

FIG. 6

[NORMAL STATE]

| LBA:0 | LBA:1 | LBA:2 | LBA:3 | DEFECT | LBA:4 | LBA:5 | LBA:6 |
|---|---|---|---|---|---|---|---|
| C:0,H:0,S:0 (U0 + LBA = 0) | C:0,H:0,S:1 (U1 + LBA = 1) | C:0,H:0,S:2 (U2 + LBA = 2) | C:0,H:0,S:3 (U3 + LBA = 3) | C:0,H:0,S:4 (—) | C:0,H:0,S:5 (U4 + LBA = 4) | C:0,H:0,S:6 (U5 + LBA = 5) | C:0,H:0,S:7 (U6 + LBA = 6) |

← DEFECT POSITION ON MEDIUM →

[ABNORMAL STATE]

| DEFECT | LBA:0 | LBA:1 | LBA:2 | LBA:3 | LBA:4 | LBA:5 | LBA:6 |
|---|---|---|---|---|---|---|---|
| C:0,H:0,S:0 (U0 + LBA = 0) | C:0,H:0,S:1 (U1 + LBA = 1) | C:0,H:0,S:2 (U2 + LBA = 2) | C:0,H:0,S:3 (U3 + LBA = 3) | C:0,H:0,S:4 (—) | C:0,H:0,S:5 (U4 + LBA = 4) | C:0,H:0,S:6 (U5 + LBA = 5) | C:0,H:0,S:7 (U6 + LBA = 6) |
| ← NO ACCESS | ← ERROR ABNORMALITY IS DETECTED | ← ERROR ABNORMALITY IS DETECTED | ← ERROR ABNORMALITY IS DETECTED | ← ERROR ABNORMALITY IS DETECTED | ← NORMAL | ← NORMAL | ← NORMAL |

STORAGE CONTROL DEVICE AND STORAGE SYSTEM

CROSS-REFERENCE TO RELATED APPLICATION

This application is based upon and claims the benefit of priority of the prior Japanese Patent Application No. 2009-201597, filed on Sep. 1, 2009 the entire contents of which are incorporated herein by reference.

FIELD

The embodiments relate to a storage system including a storage device for storing data and a storage control device for controlling the storage device.

BACKGROUND

A storage control device such as a redundant arrays of inexpensive (independent) disks (RAID) device or the like includes a storage device such as a hard disk drive (HDD) or the like. Data is dispersed and stored in a plurality of storage devices in the RAID device. Therefore, when receiving an instruction from a host, the storage control device accesses a storage device in which corresponding data is stored. The storage control device and a storage medium such as an HDD or the like, which are included in the RAID device, construct a system that has redundancy. In addition, when a failure such as an abnormality or the like occurs in the storage device, the storage control device sends notification of the state to monitoring software through a serial port or a LAN.

Figure 1:
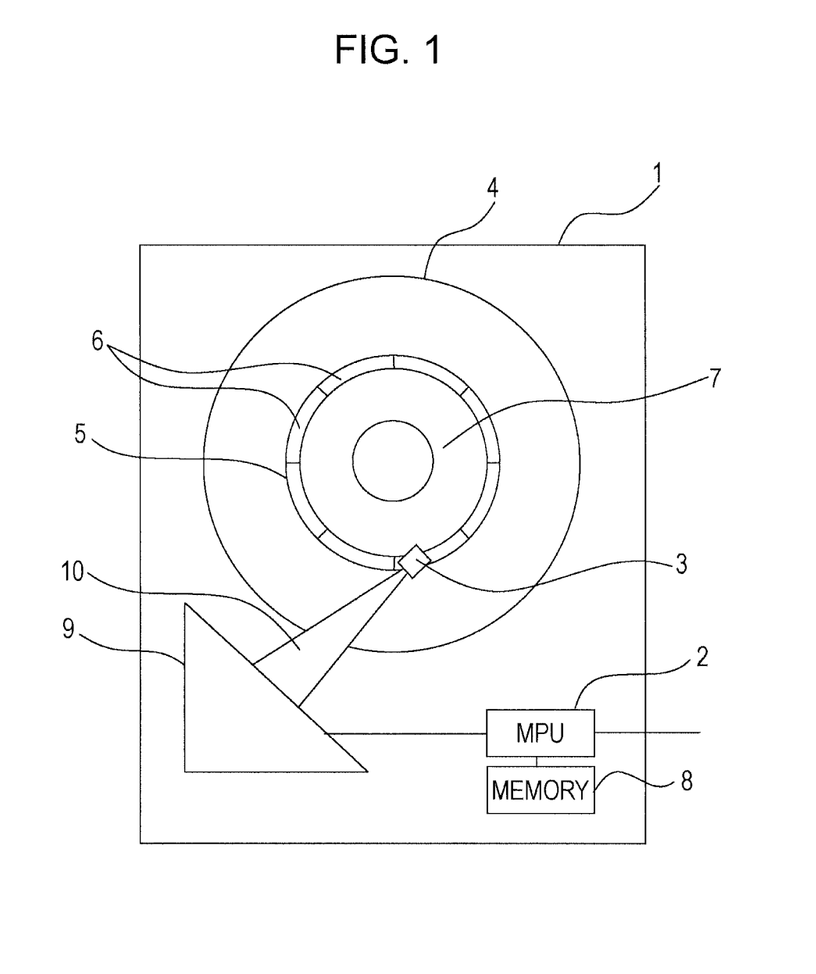
FIG. 1 is a configuration diagram of an HDD.

FIG. 1 illustrates a configuration of the HDD. When receiving an instruction from the host, a micro processing unit (MPU) 2 in the storage control device performs a read/write processing operation for data by moving a head 3 to a data area in a disk 4 that is a storage medium in an HDD 1. The disk 4 includes a plurality of cylinders 5 and a plurality of heads 3, which are mounted concentrically, and includes a plurality of sectors 6 in the individual cylinders 5. The position of a storage area is identified using a physical address based on the head 3, the cylinder 5, and the position of the sector 6. On the other hand, in order to specify the storage area, the host uses a logical address that indicates a virtual position. In a system area 7 that is a specific area in the disk, logical address/physical address translation information, which is translation logic used for performing translation between a logical address and a physical address, and medium defect information are stored. The address translation information and the medium defect information will be described hereinafter. In the HDD 1, when power is activated, the address translation information and the medium defect information are read out and written in a memory 8. By referring to the address translation information and the medium defect information, written in the memory 8, translation from the logical address to the physical address is performed. In this way, when the physical address of the indicated storage area is specified, a control section in the MPU2 causes a voice-coil motor 9 to be driven, a head actuator 10 to be moved, and the head to be moved to a corresponding cylinder position. An HDD control section causes the head to be moved to the corresponding cylinder, waits for a corresponding sector to spin around and return, and performs a read/write processing operation using the head selected by a head selector. Data received from the host is written in a corresponding physical position. Data read out is sent to the host through the storage control device.

Here, the address translation information will be described. The address translation information includes a value indicating what number block from a first block indicated by the host an address corresponds to, and associates physical addresses indicating physical positions on a medium with logical addresses sequentially arranged, for example, from zero to a maximum value. When the HDD differs in type, the numbers of cylinders, heads, and sectors differ. In addition, in the HDD, when there is a defect on a storage medium and a corresponding portion is defined as unusable, a processing operation in which the corresponding portion is assigned to an alternate area and the defect position is not used is performed. A memory in the HDD stores a defect position information table which indicates the defect position. By referring to the defect position information table and the address translation information, while the defect position is skipped, data can be read or written.

In the related art, when, at the time data on a storage medium is accessed, a logical address indicated by a host is different from a physical address actually read or written, there occurs a problem in which data corruption arises or undesirable data is overwritten, and reliability is damaged. When a head selector is out of order, a head corresponding to a physical address obtained by translating a logical address from the host is not selected and a false head continues to be selected.

Continued failures such as physical failures of head selectors or the like account for the main factors of address mistranslation in the related art.

Therefore, there is adopted a method in which, when a data position indicated by the host is not normally translated into a data position where data is to be actually read or written, the mistranslation is detected. In the detection method of the related art, when user data is written, user data is written in one block with the addition of a logical address value indicating a logical address. In addition, when data is read, the added logical address value is compared with the address value indicated by the host at the time data is read. When the added logical address value matches the address value indicated by the host, it is determined that the read user data corresponds to data located at a correct position. Here, when the added logical address value does not match the address value indicated by the host, it is determined that the read user data corresponds to data located at an erroneous position, and the HDD informs the host or the storage control device of the presence of an abnormality. Accordingly, since interpolation can be performed using redundancy data of the RAID device, continued mistranslation can be resolved using the above-mentioned technique. In addition, when mistranslation is continued, a read/write processing operation is performed at an erroneous position both at the time data is written and at the time data is read. Since user data and a logical address value are newly written, it is determined that comparison of the logical address value at next read-in indicates normality. Since user data written in a corresponding area is also correct, no problem occurs.

Related patent documents are as follows: Japanese Laid-open Patent Publication No. 9-223366, Japanese Laid-open Patent Publication No. 2006-72435, and Japanese Laid-open Patent Publication No. 2003-228925.

In recent years, soft errors in a memory in an HDD have accounted for the main factors of address mistranslation. Soft error is a phenomenon in which defect position information written in the memory is destroyed. In storage control devices of recent years, a random access memory (RAM) has been manufactured so as to have a high density and a fine structure, in order to establish high capacity. Therefore, a soft error in which a bit is inverted owing to the influence of an alpha ray or a neutron ray has a high probability of occurrence.

A numerical value that is written in the memory and indicates a defect position is bit-inverted owing to the soft error and hence causes mistranslation. For example, when the third digit is bit-inverted in "0100" indicating that there is a defect in the fifth sector from "0", "0000" turns out to be stored in the memory. Namely, since "0000" indicates that there is a defect in the first sector from "0", a storage area which normally corresponds to the defect position and is not supposed to be accessed is accessed. This state is defined as an abnormal state.

Furthermore, since the soft error is not physical destruction of hardware, defect position information is read from a system area on a disk and rewritten in the memory, at the time power is activated owing to restart or the like. Owing to the rewrite processing operation, correct defect-position information is written. This state is defined as a normal state.

In this way, when the soft error occurs, the state transits from the normal state to the abnormal state and from the abnormal state to the normal state. When a write processing operation is performed during the state transition, an error is not reported from the HDD to the host or the storage control device. Therefore, data is left to be written in a storage area that is actually erroneous or data is written in a storage area in which data is not allowed to be written.

In the technique of the related art, in the case in which the state transits among three states, namely, from "normality" to "abnormality" and then to "normality", even if a logical address value written along with user data is compared with a logical address value indicated from the host, the case in which the same address value is written occurs and hence the HDD does not report an error. Even if data, located at a position that is different from a normal position, is accessed, the data is not determined as abnormal and is transmitted to the host or the storage control device. Data corresponding to an instruction from the host is not obtained.

SUMMARY

According to an aspect of the invention, a storage control device for controlling the storage device including a medium for storing data, logical address information, and address translation information and a memory for storing the address translation information read from the medium includes a first receiver for receiving a write request including logical address information, a first sending module for sending a read request including the logical address information of the write request to the storage device, a second receiver for receiving data and logical address information stored in the medium in accordance with the read request from the storage device, and a second sending module for sending an instruction to cause the storage device to write the address translation information stored in the medium into the memory when the logical address information received by the second receiver is different from logical address information included in the write request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a state diagram illustrating the state of data in a case in which an rewrite processing operation for address translation information from a system area to a memory is performed owing to power reactivation for the HDD or the like;

DESCRIPTION OF EMBODIMENTS

Embodiments of a storage control device, a storage system and a storage/reproduction method will be described in detail with reference to figures attached, hereinafter.

Figure 2:
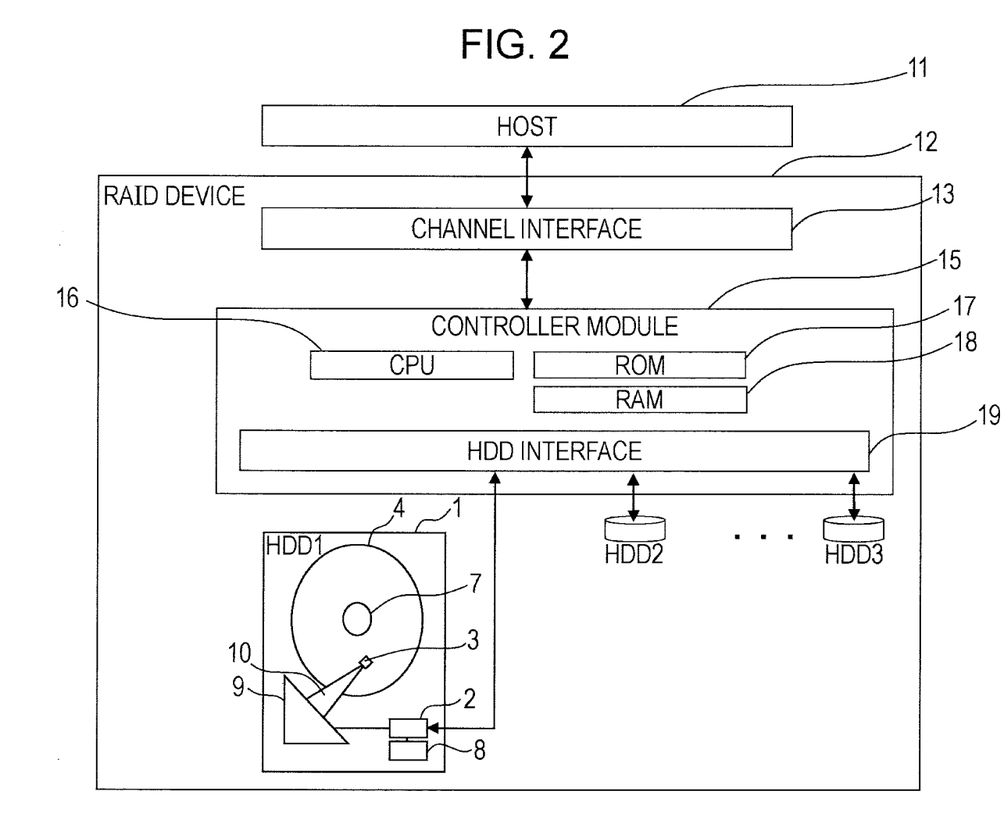
FIG. 2 is a hardware configuration diagram of a storage system in which a storage control device is used.

FIG. 2 illustrates a hardware configuration diagram of a storage system according to the embodiment. A RAID device 12 that is the storage control device includes a channel interface 13 that receives an instruction from a host 11, a plurality of HDDs 1 that perform read/write operations for data, and a controller module 15 that controls the HDDs 1. As illustrated in FIGS. 1 and 2, each of the HDDs 1 includes a disk 4 that is a storage medium used for storing data. A system area 7 stores address translation information used for performing translation between a physical address that indicates a physical position on the disk 4 and a logical address that logically indicates the physical address. The address translation information read out from the system area 7 is written in a memory. The HDD 1 includes a write control section. When the HDD 1 receives a write instruction from the storage control device, the write control section translates a logical address, included in the write instruction, into a physical address by referring to the address translation information written in the memory and writes the logical address and data, both included in the write instruction, in a position indicated by the physical address. In addition, the HDD 1 includes a read control section. When the HDD 1 receives a read instruction from the storage control device, the read control section translates a logical address, included in the read instruction, into a physical address by referring to the address translation information written in the memory and reads data from a position indicated by the physical address.

The controller module 15 includes a central processing unit (CPU) 16 that performs arithmetic processing at the time an instruction is received, a read only memory (ROM) 17 that stores a program or the like, a random access memory (RAM)

18 that functions as a temporary storage area and deploys data such as a control table or the like, and an HDD interface 19 connected to the HDD 1.

Figure 3:
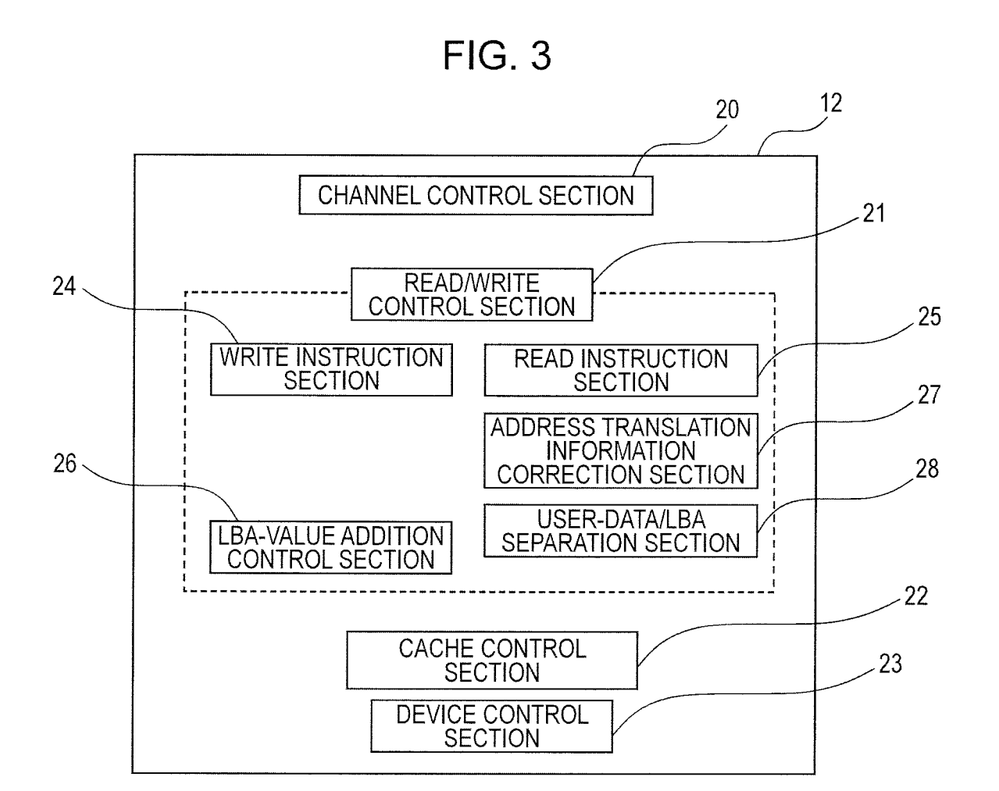
FIG. 3 is a firmware configuration diagram of a RAID device that is a storage control device.

FIG. 3 illustrates the firmware configuration diagram of the RAID device. The RAID device 12 that is the storage control device includes a channel control section 20 that receives an instruction from the host 11, a read/write control section 21 that controls a read/write operation for the HDD 1, a cache control section 22 that controls a cache memory, and a device control section 23 that controls the HDD interface 19. The read/write control section 21 includes a write instruction section 24 that controls a write operation for data and a read instruction section 25 that controls a read operation for data. The write instruction section 24 includes an LBA-value addition control section 26 that adds an LBA value, which is a logical address value, to user data. The read instruction section 25 includes address translation information correction section 27 that compares a read LBA value with an LBA value added to user data to be written and a user-data/LBA-value separation section 28 that separates an LBA value added to read user data from the user data.

When the read instruction section 25 receives a write instruction from the host, the read instruction section 25 sends a read instruction, which includes a logical address included in the write instruction from the host, to a storage device. On the basis of a read instruction from the read instruction section 25, in the case in which data read from a corresponding position by the storage device includes a logical address, when the logical address included in the write instruction received from the host is different from the logical address included in the read data, the address translation information correction section reads the address translation information from the system area and writes the read address translation information in the memory.

In addition, when the read instruction section 25 receives a read instruction from the host, the read instruction section 25 sends a read instruction, which includes a logical address included in the read instruction from the host, to the storage device. On the basis of a read instruction from the read instruction section 25, in the case in which data read from a corresponding position by the storage device includes a logical address, when the logical address included in the read instruction received from the host is different from the logical address included in the read data, the address translation information correction section reads the address translation information from the system area and writes the read address translation information in the memory.

Here, a RAID device will be described. The RAID device has seven levels ranging from RAID 0 to RAID 6 and balances reliability with speed by combining individual RAID levels. The RAID 1 writes the same content into a plurality of hard disks simultaneously. This operation is called mirroring. The RAID 1 is the simplest RAID and has high fault tolerance. In addition, in the RAID 1, controller trouble, which is the greatest weakness of the RAID, is easily dealt with. At least two drives are necessary for the RAID 1. When one drive is out of order, the other drive is unlikely to be out of order simultaneously. Therefore, the system can continue to work.

The RAID 5 prevents bottlenecks occurring in the RAID 3 and the RAID 4 by dispersing and storing data into a plurality of hard disks along with error-correcting code data. At least three drives are necessary for the RAID 5. The RAID 5 has better usage efficiency than the RAID 1 and the RAID 1+0. In addition, since the RAID 5 disperses and stores data into a plurality of disks in the same way as the RAID 0, the RAID 5 has good readout performance. On the other hand, since the RAID 5 recreates parity at the time of a write operation, it is necessary for the RAID 5 to perform a read operation from a disk and a parity operation.

Next, translation between a logical address and a physical address, which is performed at the time a data read/write operation is performed in the storage control device, will be described. The translation information widely varies owing to the different types of storage devices such as HDDs or the like.

The following example according to the embodiment will be described. Since, as mentioned above, the translation information varies owing to the individual HDDs, the translation information is individually stored in the system area 7 that is a specific medium area in the HDD. The read/write control section associates, using the translation information, a physical address with a logical address and controls a read/write operation. A Table 1 illustrates the translation information from LBA to CHS, which is stored in the system area.

TABLE 1

| | |
|---|---|
| maximum sector value | 9 |
| maximum head value | 3 |
| maximum cylinder value | 99 |
| defect 1 | C: 0, H: 0, and S: 4 |
| defect 2 | C: −1, H: −1, and S: −1 |
| defect 3 | C: −1, H: −1, and S: −1 |

In Table 1, the individual maximum numbers of sectors, heads, and cylinders and the physical positions of defect parts are illustrated.

In the translation information from a logical address to a physical address, it is supposed that there are 10 sectors from 0 to 9, a maximum sector value, 4 heads from 0 to 3, a maximum head value, and 100 cylinders from 0 to 99, a maximum cylinder value. Therefore, it is supposed that, because there are 10 sectors, 4 heads, and 100 cylinders, the HDD has 4000 blocks as a physical storage area. In addition, it is supposed that up to 3 medium defects are allowed, and an area in which three defect areas (defects 1 to 3) are stored is reserved. In addition, "C: 0, H: 0, and S: 4" is stored in the defect 1 illustrated in Table 1 and indicates that a portion corresponding to a physical position, that is, a cylinder that is "0", a head that is "0", and a sector that is "4", is a medium defect. Since a negative value "−1" that does not physically exist in "C, H, and S" is stored in the defects 2 and 3, it is indicated that the defects 2 and 3 are not used. In Table 1, it is supposed that the number of medium defects is one and final physical positions are backups (backups 1 and 2) and not used. Namely, as a matter of logic, by constantly setting effective capacity to 3997 blocks, LBA 0 to LBA 3996, disk mediums including physical defects ranging from 0 to 3 are regarded, for a RAID device, as an HDD that includes a disk medium having a capacity of 3997 blocks in the same specification. An example of the relationship of the translation between logical addresses and physical addresses is illustrated in FIG. 4.

Figure 4:
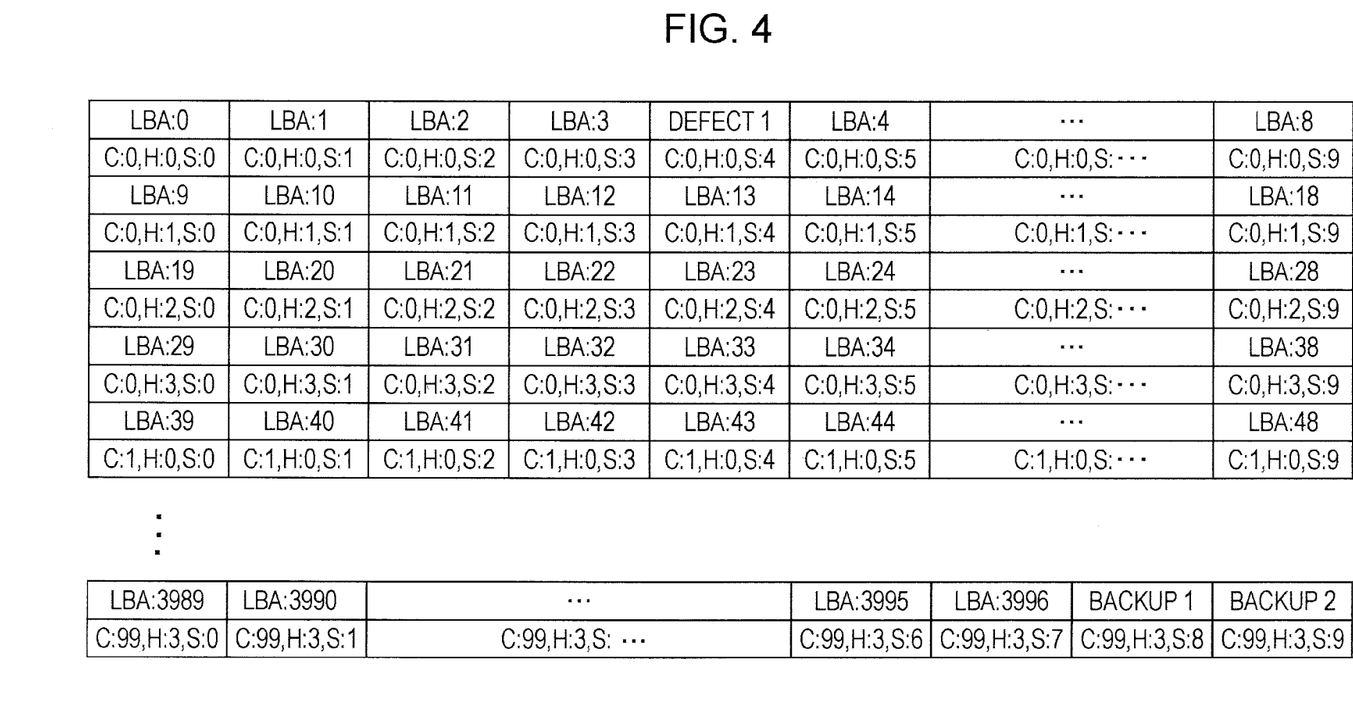
FIG. 4 is a translation-information relationship diagram illustrating translation between logical addresses and physical addresses.

FIG. 4 is a translation-information relationship diagram illustrating translation between logical addresses and physical addresses. As a defect that has existed already, the defect 1 is recorded to correspond to "C: 0, H: 0, and S: 4". As mentioned above, FIG. 4 illustrates a correspondence relationship between LBAs, which are logical address values, and C indicating cylinders, H indicating heads, and S indicating sectors.

Figure 5:
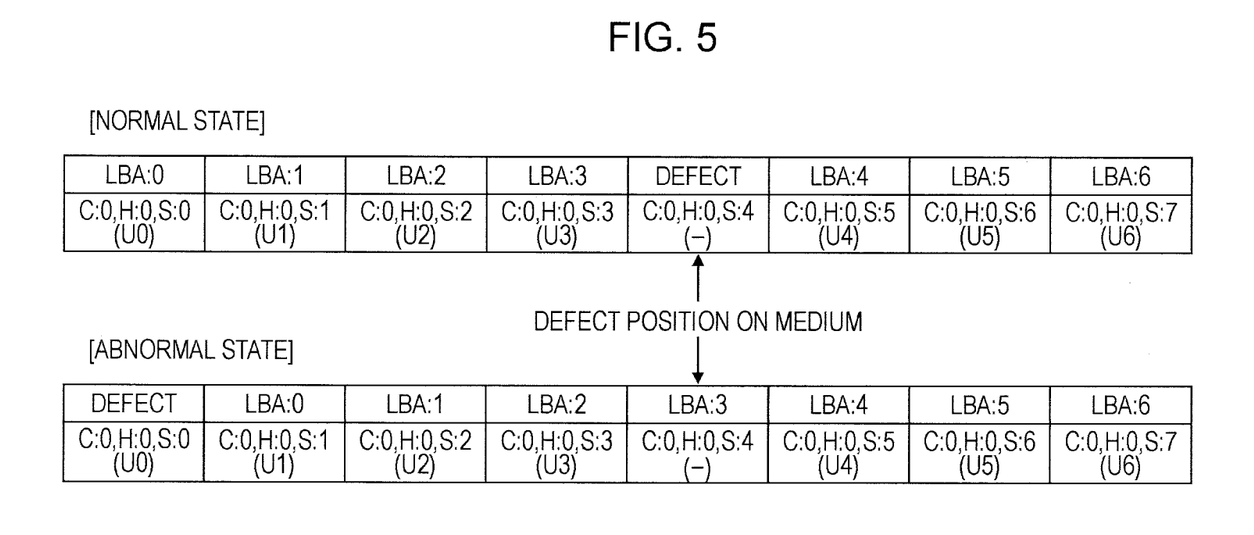
FIG. 5 is a diagram illustrating a correspondence relationship between logical addresses and physical addresses due to logical translation.

Here, an abnormality due to a soft error in the memory, which is resolved according to the embodiment of the present invention, will be described. When logical address/physical address translation is as illustrated in FIG. 4, it is supposed that one bit of data on the memory is inverted owing to the soft error mentioned above. For example, FIG. 5 illustrates a correspondence relationship between logical addresses and physical addresses due to logical translation. A defect position corresponds to "C: 0, H: 0, and S: 4" indicated in the top line in a normal state. Owing to the soft error, "S: 4" ("0100" in 4-bit expression) in the "C: 0, H: 0, and S: 4" turns into "S: 0" ("0000" in 4-bit expression). As illustrated in the bottom line in an abnormal state, physical positions indicated by LBAs 0 to 3 turn out to be changed. Therefore, in the case in which the LBA 0 is read, while, in the normal state, user data (U0) stored in the physical position "C: 0, H: 0, and S: 0" is supposed to be read, user data (U1) stored in the physical position "C: 0, H: 0, and S: 1" turns out to be read in the abnormal state.

Figure 6:
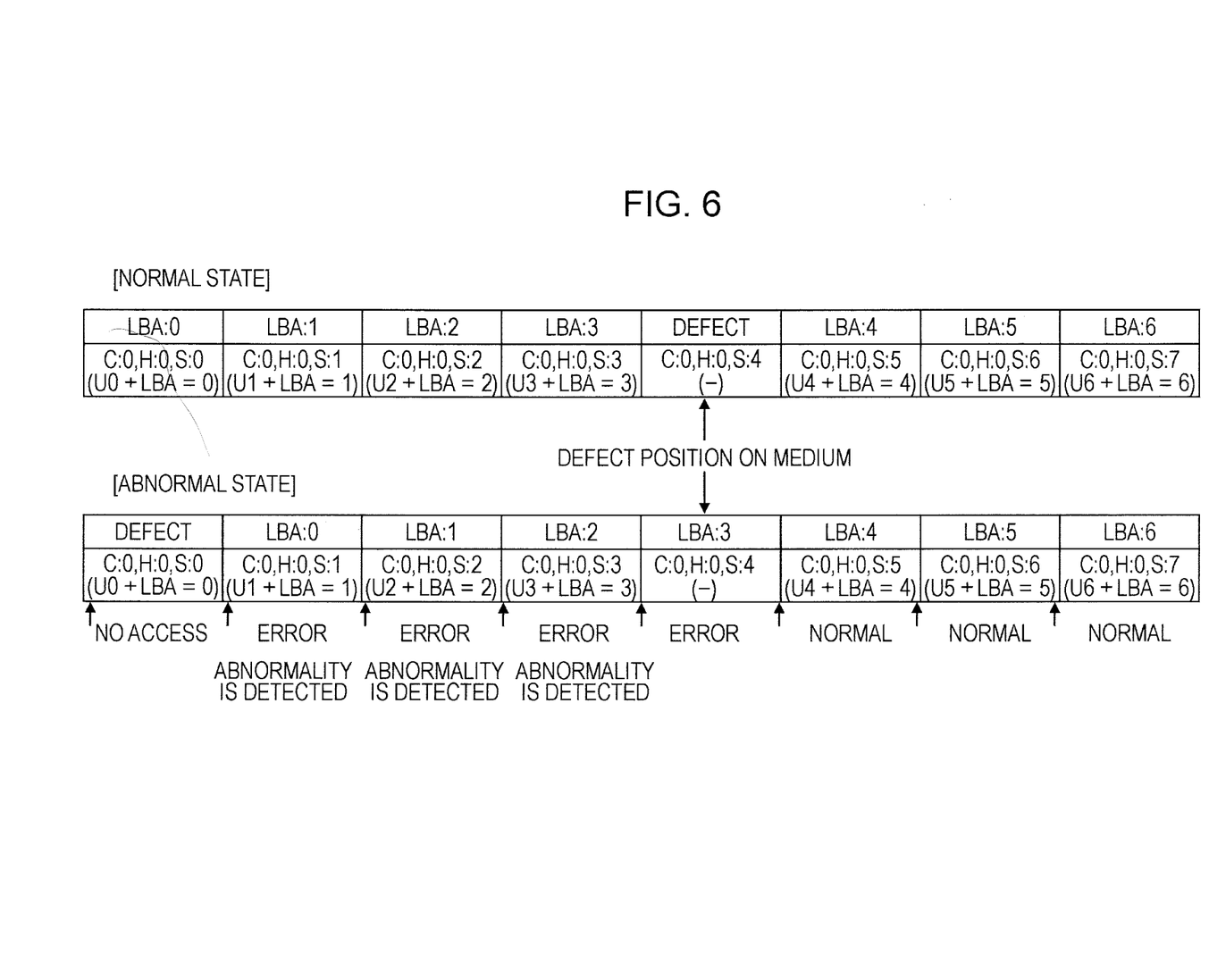
FIG. 6 is a transition diagram illustrating state transition from a normal state to an abnormal state in a case in which LBA values are added.

In comparison with the embodiment, a comparative example will be described. FIG. 6 illustrates state transition from a normal state to an abnormal state in the case in which LBA values are added. The addition of LBA values allows abnormality detection. Namely, by comparing an LBA value added to user data (Ux) with an LBA value prior to translation, an abnormality is detected in LBAs 0 to 3 at the time a read operation is performed.

Figure 7:
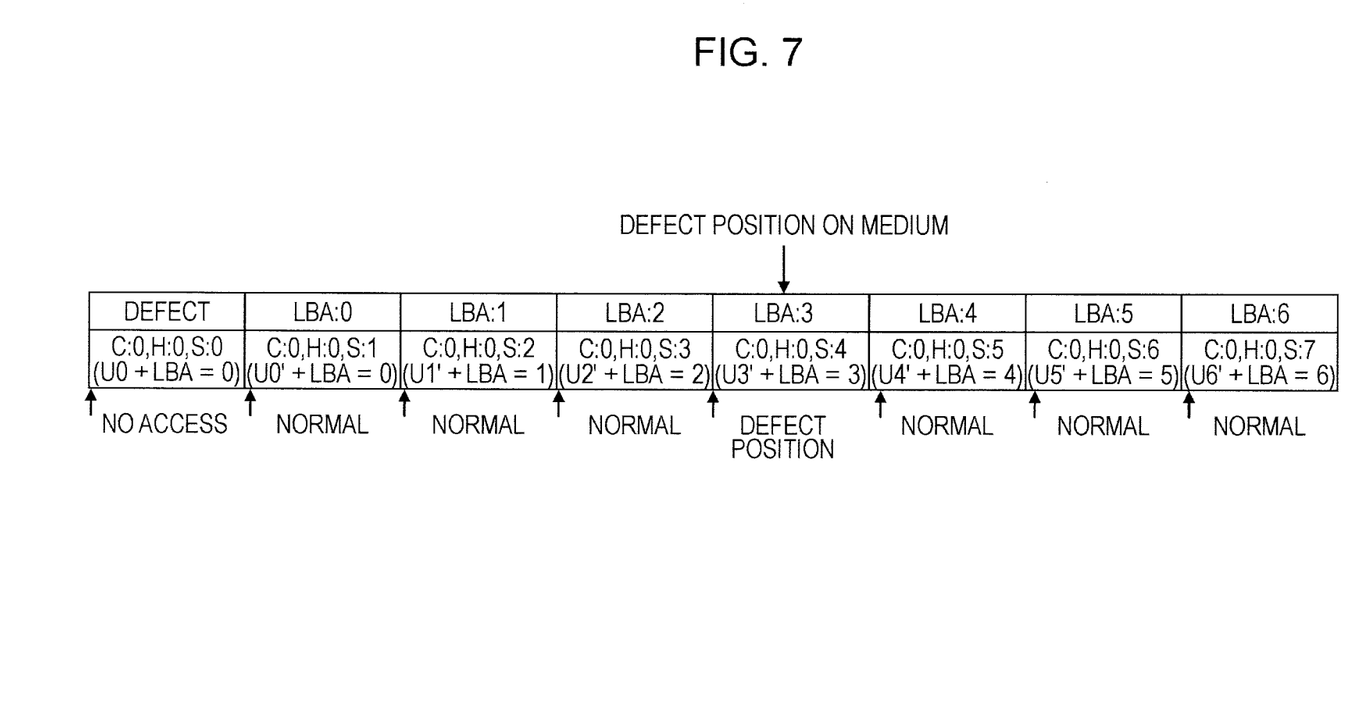
FIG. 7 is a state diagram illustrating the state of data in a case in which data is written in an abnormal state.

Furthermore, as illustrated in FIG. 7, in the case in which a write operation is performed in the abnormal state, data is written in a position that is different from a normal position. However, since, in the case in which a read operation is performed in the continued abnormal state, data is also read from the position that is different from the normal position in the same way, there is no discrepancy.

Figure 8:
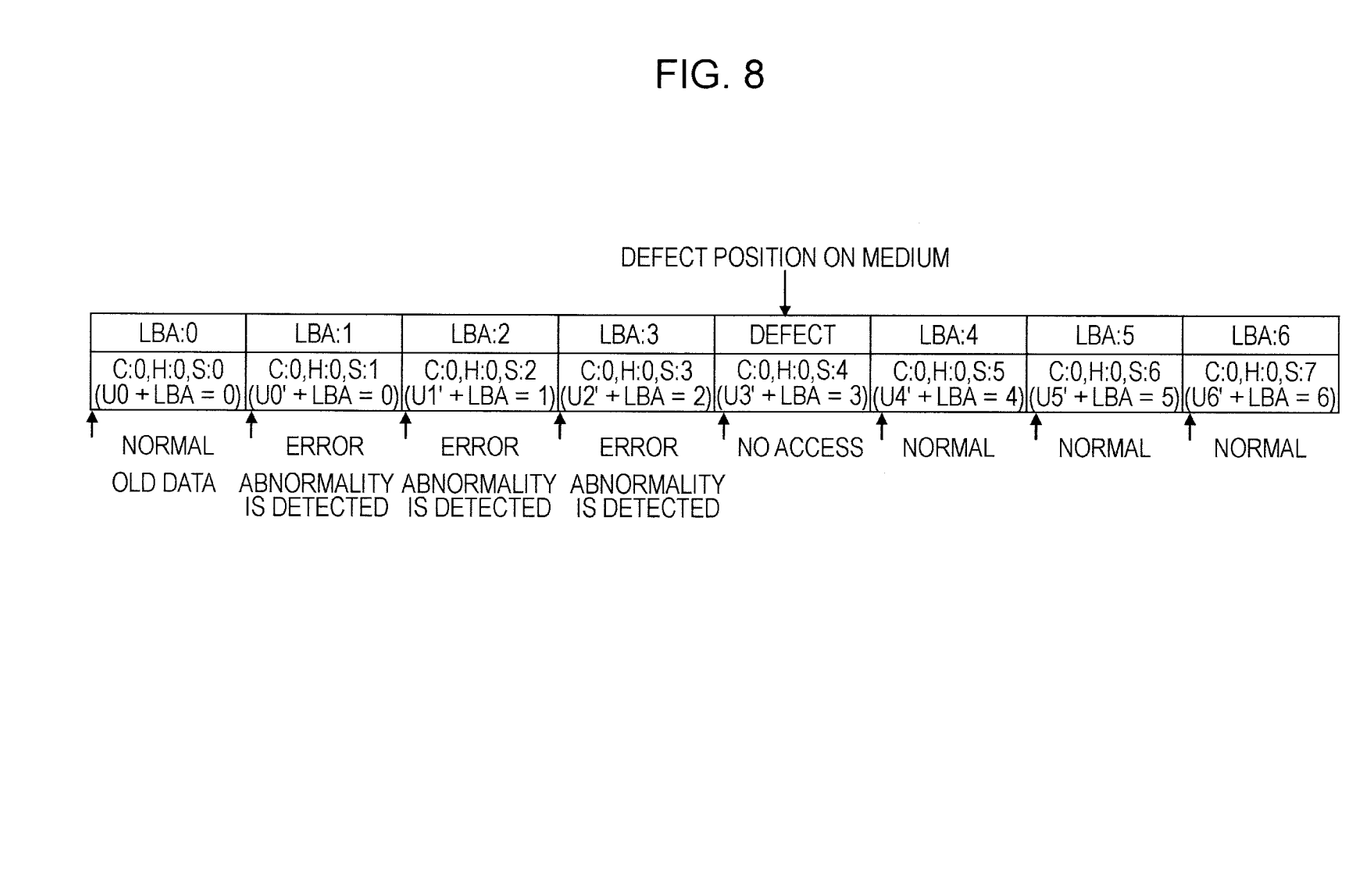

However, simply by adding LBA values, it is difficult to prevent a problem from occurring in the state in which a write operation is performed in the abnormal state, as illustrated in FIG. 8. When a rewrite processing operation for address translation information from the system area to the memory is performed owing to power reactivation for the HDD or the like, the state of the translation information changes to the normal state. In this case, since, in the LBAs 1 to 3, LBAs 1 to 3 prior to translation do not match LBAs 1 to 3 added to the user data, an abnormality can be detected. However, since, in the LBA 0, that is, in the position corresponding to "C: 0, H: 0, and S: 0", an LBA prior to translation is "0" and an LBA added to the user data is also "0", thereby both matching each other, an abnormality is not detected.

In addition, "C: 0, H: 0, and S: 4" corresponds to a defect position on the medium. The defect is arbitrarily defined as a defect at which a data write failure occurs every 100 times or every 1000 times or the like. While a data write failure does not occur every time, a write operation is expected to be performed safely in the defect portion at about 80 percent probability.

However, user data corresponding to the position "C: 0, H: 0, and S: 0" is old and different from normal data. Therefore, in the embodiment, in addition to the addition of an LBA value, an LBA value added to user data to be written at the time a write operation is performed is compared with an LBA value added to user data stored at a write position on the medium. In addition, it is determined whether or not a logical address value that is logical address additional data read out is different from a logical address value indicating the object of an access instructed by the host. Accordingly, position miscalculation at the time the state changes from the abnormal state to the normal state can be detected.

Figure 9:
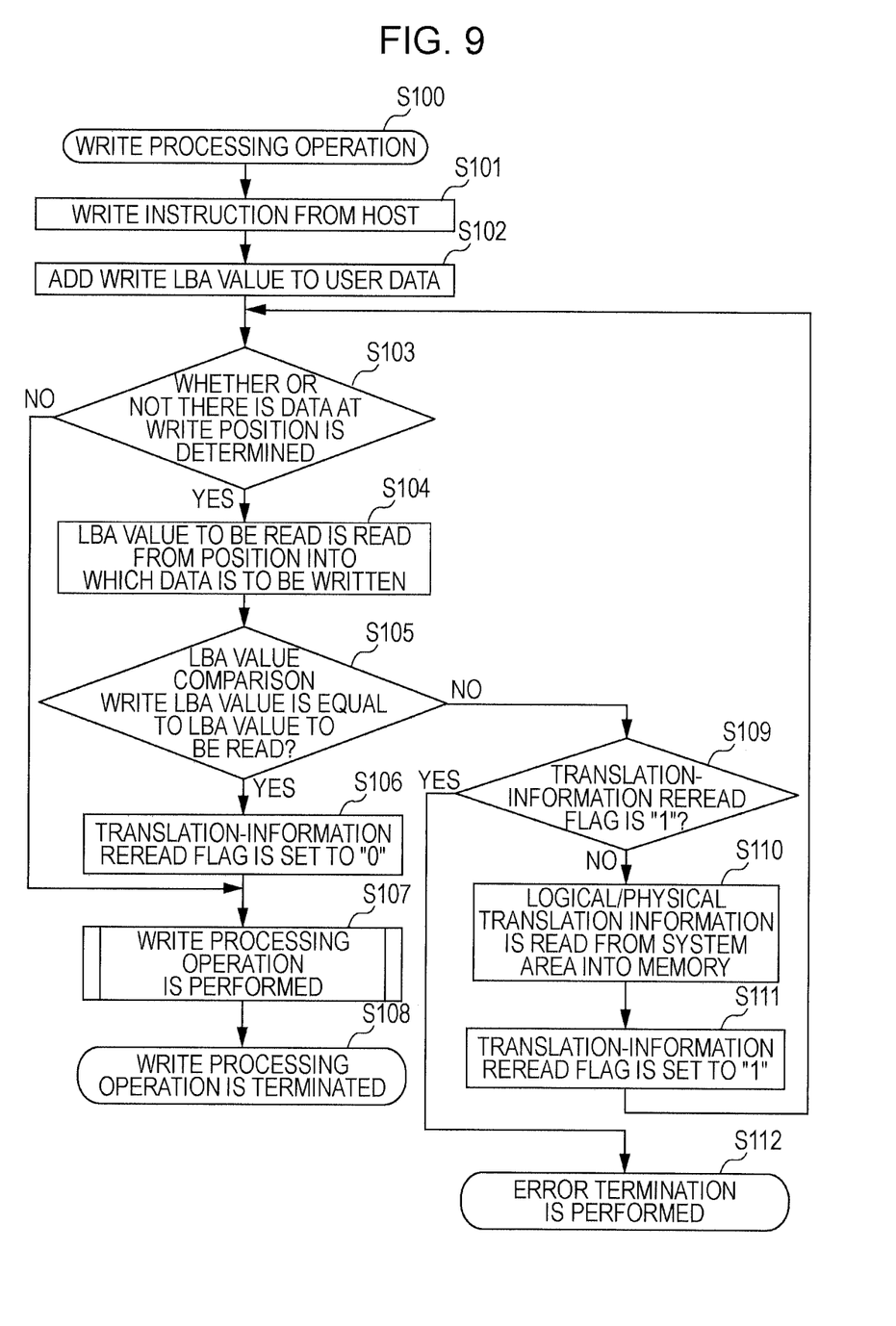
FIG. 9 is a flowchart illustrating a write processing operation performed in the storage control device.

FIG. 9 illustrates the flowchart of a write processing operation performed in the storage control device in the embodiment. When the RAID device receives an instruction from the host and performs a write processing operation (S100), the channel control section in the RAID device receives a write instruction for user data from the host (S101). Next, the LBA-value addition control section adds an LBA value to the user data received from the host (S102). The LBA value indicates a position on the storage medium, in which the user data, an object of a write operation, is to be written (write LBA value). The read control section determines whether or not user data has been written in the write position (S103).

When, as a result of the data presence/absence determination, it is determined that data has been written (S103 Yes), the read control section reads the LBA value written in the write position (S104). The LBA value is an LBA value added to user data already written. In addition, the address translation information correction section compares the read LBA value with the LBA value added to the user data to be written (S105).

When, as a result of the comparison of the LBA values, it is determined that the LBA values are the same (S105 Yes), the device control section rereads logical address/physical address translation information, stored in a RAM in the HDD, from the system area on the disk medium, and sets a translation-information reread flag to "0" (S106). The translation-information reread flag is stored in a RAM in the controller module or the RAM in the HDD. The translation information may be stored in the RAM in the controller module rather than the RAM in the HDD. In addition, the write control section causes the user data and the added LBA value to be written (S107), and after that the write processing operation is terminated (S108).

In addition, when, as a result of the data presence/absence determination, it is determined that data has not been written (S103 No), there is no LBA value to be compared with an added write LBA value. Therefore, the write processing operation is performed without change (S107), and after that the write processing operation is terminated (S108). In the case in which, even if there is no user data, an LBA value has been stored in a storage area on the disk medium, it is determined that data has been written, at the time of the data presence/absence determination.

On the other hand, when, as a result of the comparison of the LBA values, it is determined that the LBA values are not the same (S105 No), it is determined whether or not the translation-information reread flag is "1" (S109). When the translation-information reread flag is not "1" (S109 No), the translation information stored in the system area on the disk medium is read into the RAM (S110). In addition, the translation-information reread flag is set to "1", and the data presence/absence determination at the write position is performed (S103).

When the translation-information reread flag is "1" (S109 Yes), error termination is performed without change (S112). The case that the translation-information reread flag is "1" means that, while LBA values are compared after a translation information reread operation is performed, the LBA values are not the same. Namely, since there is a possibility that a successive abnormality exists, error is reported to the host.

According to the storage control device in the embodiment, an abnormality can be detected by confirming, prior to a write operation, whether or not there is an abnormality in a position in which data is to be written.

Next, a second embodiment of the storage control device will be described.

The comparison determination between the LBA values is performed at a time different from that in the first embodiment. At a predetermined time, the storage control device confirms an LBA value written in a corresponding physical position on the medium. The predetermined time may be a time when there is no access instruction from the host to the HDD or a time when power is activated. A periodic patrol processing operation, performed at a time other than a time when a write operation or a read operation is instructed, causes a burden, imposed on write and read operations, to be reduced.

When an LBA value added to user data is confirmed and the temporal abnormality of address translation due to a soft error in the memory is detected, the information of translation from LBA to CHS is read from the system area and stored in the RAM. Accordingly, using normal translation information, the storage system can perform address translation.

Figure 10:
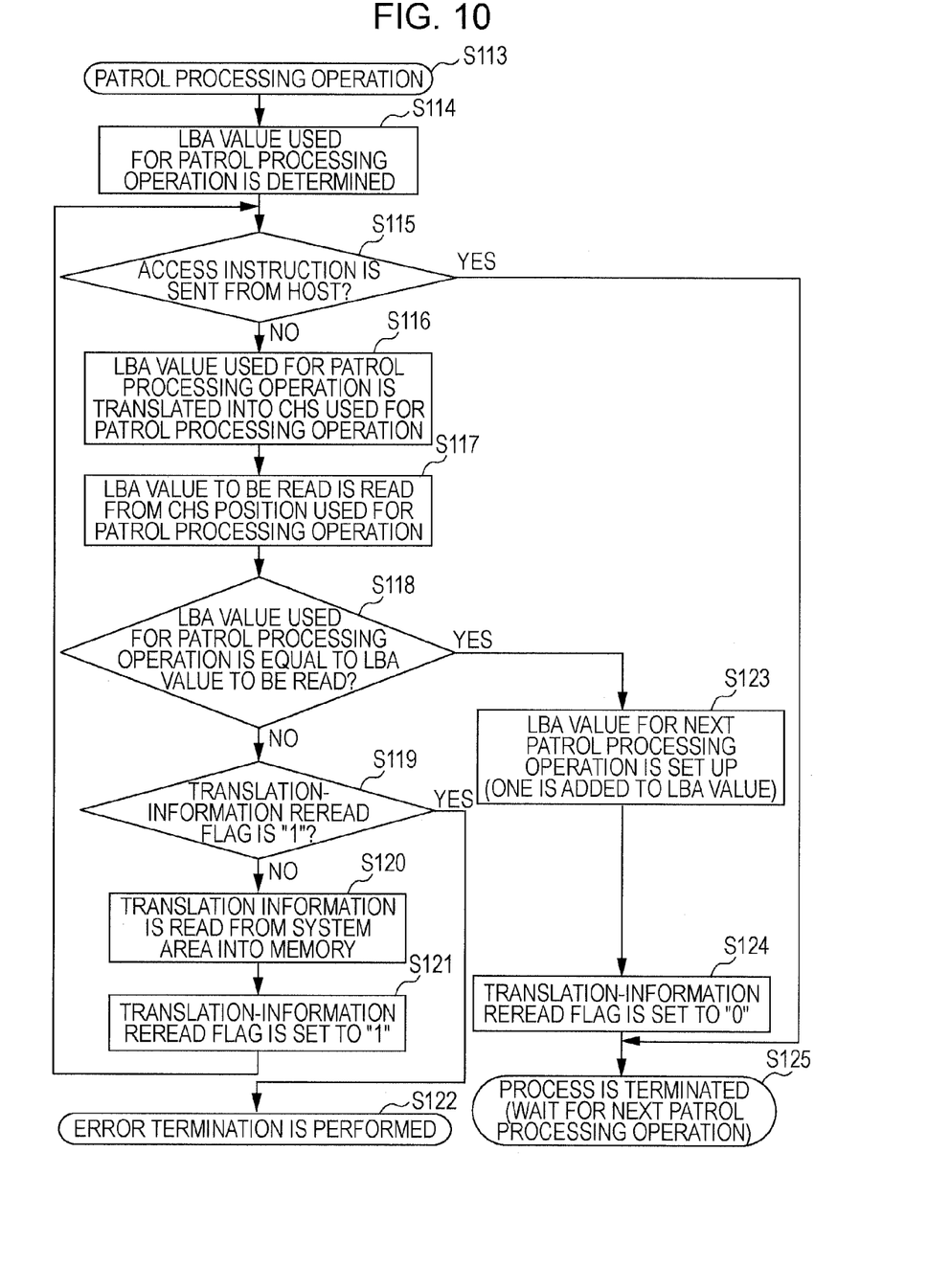
FIG. 10 is a flowchart illustrating a patrol processing operation.

FIG. 10 is a flowchart illustrating the patrol processing operation. The patrol processing operation (S113) is periodically performed. The read/write control section determines an LBA value to be subjected to the patrol processing operation (S114). In addition, the channel control section determines whether or not an access instruction is sent from the host to the HDD (S115). When no access instruction is sent from the host (S115 No), the read/write control section uses, through the device control section, the translation information table stored in the RAM in the HDD, and identifies a position on the medium by translating an LBA value used for the patrol processing operation into CHS information indicating a physical position on the medium (S116). In addition, an LBA value (an LBA value to be read) stored in the position is read (S117).

Here, the address translation information correction section determines whether or not the LBA value set for the patrol processing operation and the LBA value to be read are the same (S118). When the LBA value set for the patrol processing operation is different from the LBA value to be read (S118 No), it is confirmed whether or not the translation-information reread flag has been set to "1" (S119). When the translation-information reread flag is not "1" (S119 No), the translation information stored in the system area SA is read into the RAM on the HDD (S120). In addition, the translation-information reread flag is set to "1", and the process returns to the operation in which it is determined whether or not there is an access instruction from the host (S114), again. In addition, when the translation-information reread flag is "1", an error is reported to the host, and after that error termination is performed (S122).

On the other hand, when the LBA value set for the patrol processing operation and the LBA value to be read are the same (S118 Yes), it is determined that there is no abnormality, and, by adding one to the LBA value for the next patrol processing operation, an LBA value indicating a next position is set up (S123). After setting up the LBA value, the translation-information reread flag is set to "0" (S124) and the process is terminated (S125) to wait till the next patrol processing operation is performed.

When an access instruction is output from the host at the time patrol processing operation is started (S115 Yes), the process is terminated without performing the patrol processing operation (S125). After a predetermined time elapses, abnormality detection is performed by patrolling an LBA value again.

Next, the patrol processing operation after a defect position is identified will be described. A value that is not used as an actual address, such as "−1" or the like, is written as an LBA value added at the time a defect registration operation is performed. In addition, an LBA value written in a position in which there is supposed be a defect is read at the time power is activated or there is no access, and it is confirmed whether or not the LBA value is "−1". When the LBA value read from the defect position is a value, such as "1" or the like, that indicates a position actually existing on the medium, it is determined that, owing to position miscalculation caused by a temporal abnormality such as a soft error or the like, the LBA value has been written in an erroneous position. While a defect portion is arbitrarily set by a user or a manufacturer, a write operation can be performed at about 80 percent probability in a storage area that is registered as a defect portion. Therefore, write and read operations for the LBA value are performed.

Figure 11:
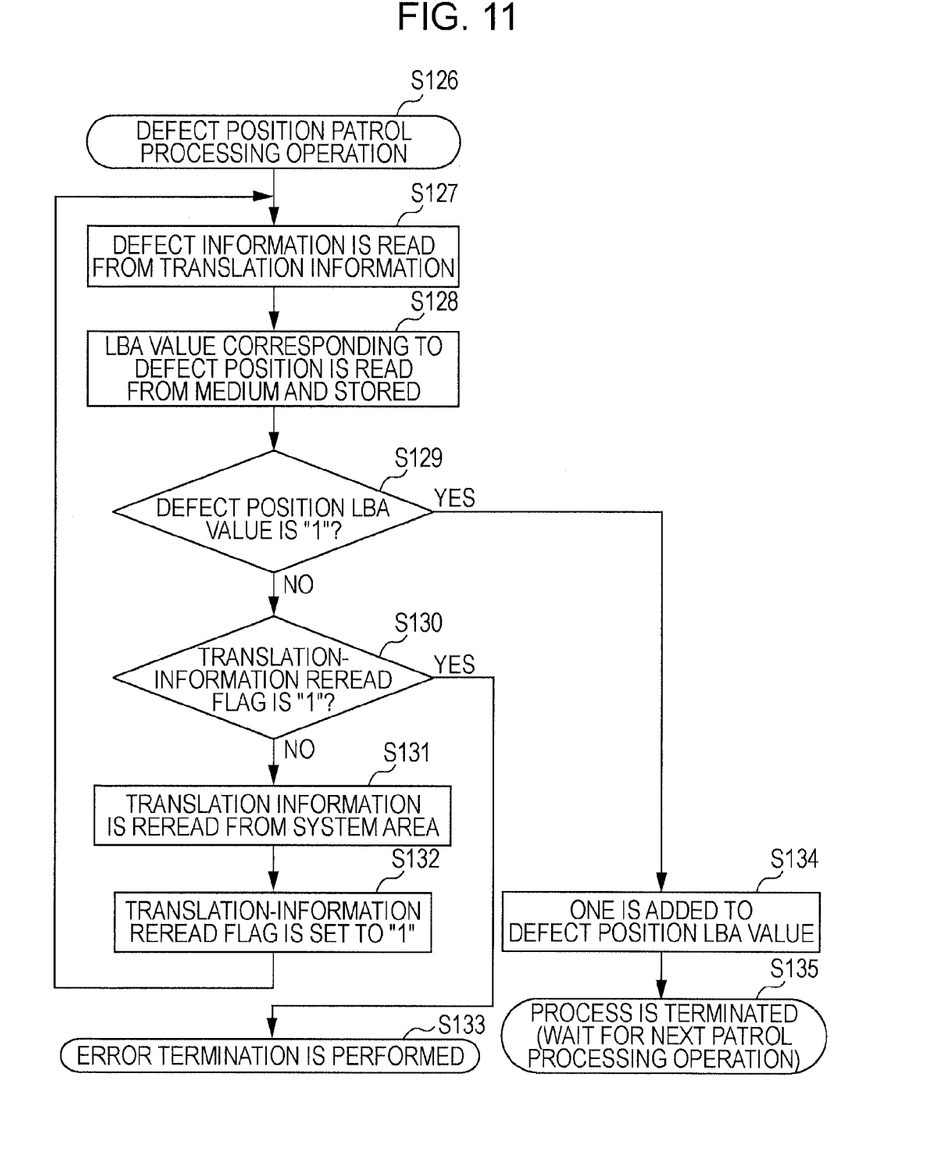
FIG. 11 is a flowchart illustrating a patrol processing operation in which a defect position is identified.

FIG. 11 is a flowchart illustrating the patrol processing operation (S126) in which a defect position is identified. In the storage control device according to the embodiment, a value, such as "−1", that does not exist on the medium is written in advance in a block that is on the medium and defined as a defect position. The case in which an actual LBA value exists in LBA values added to the defect portions indicates that a translation abnormality occurs at the time a write operation is performed and hence the LBA value has been written in a position that is not a proper position in which the LBA value is to be written.

The read control section causes the defect position information to be read from the translation information deployed in the RAM in the HDD (S127). On the basis of the defect position information read from the translation information, an LBA value on the medium is read and stored in the RAM (S128). It is determined whether or not the LBA value (defect position LBA) is "−1" (S129). When the defect position LBA is "−1" (S129 No), it is determined whether or not the translation-information reread flag is "1" (S130). When the translation-information reread flag is not "1" (S130 No), the translation information stored in the system area is reread and stored in the RAM (S131). In addition, the translation-information reread flag is set to "1" (S132), the operation in which the defect position information is read from the translation information deployed in the RAM in the HDD is performed again (S127).

In addition, when the translation-information reread flag is "1" (S130 Yes), an error is reported to the host, and after that the process is terminated (S133).

On the other hand, the defect position LBA value is "−1" (S129 Yes), one is added to the defect position LBA (S134), and after that the process is terminated (S135). After a predetermined time elapses after the process is terminated, the patrol processing operation is repeated till all LBA values are determined.

In addition, the LBA values may be added to a servo location information portion rather than a user data portion. Since servo information is certainly read both in a write operation and a read operation, the comparison of the LBA values can be performed in real time by adding the LBA values to the servo location information portion. Therefore, high efficiency can be achieved. In addition, when a defect registration operation is performed, an LBA value added to the servo information is updated. Since, except at times the defect registration operation and an initialization operation are performed, the translation information from the LBA to the CHS is not changed, the translation information is updated only at times the defect registration operation and the initialization operation are performed. Therefore, the method according to the embodiment can reduce processing time in comparison with a method in which an LBA value is added to user data whenever a write operation is performed.

In another embodiment, translation information that is periodically stored in a system area at a time there is no access from a host may be compared with translation information written in a memory. The translation information stored in the system area is compared with the translation information written in the memory, and hence a mismatch between data in the two pieces of translation information is determined. When the mismatch is confirmed in the comparison, the translation information written in the memory is updated using the translation information stored in the system area. According to the storage control device in the embodiment, since the translation information itself is compared, burdens are not placed on write and read processing operations.

As described above, the storage control device disclosed in the embodiments can prevent a successive abnormality regarding translation between a logical address and a physical address and miscalculation of data position due to a temporal abnormality such as a soft error are detected. The storage control device disclosed in the embodiments can prevent a data abnormality caused by the mistranslation between a logical address and a physical address, and then can ensure reliability of data storing of the storage system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage system including a storage device and a storage control device, comprising:
    the storage device including:
        a medium to store data, a logical address, and address translation information used to perform translation between a physical address indicating a physical position on the medium and a logical address,
        a memory to store the address translation information that is read from the medium, and
        a processor to execute a procedure, the procedure including:
            translating a logical address, included in a read instruction from the storage control device, into a physical address by referring to the address translation information stored in the memory and reading data and a logical address stored in the medium from a position indicated by the translated physical address, upon receiving the read instruction from the storage control device,
            sending the data and the logical address read from the medium to the storage control device, and
            translating a logical address, included in a write instruction from the storage control device, into a physical address by referring to the address translation information stored in the memory, and writing the logical address and data, included in the write instruction, in a position indicated by the physical address in the medium, upon receiving the write instruction from the storage control device; and
    the storage control device comprising:
        a processor to execute a procedure, the procedure including:
            receiving a write request including a logical address from a host,
            sending a read instruction including the logical address of the write request to the storage device before sending a write instruction to the storage device when receiving the write request from the host,
            receiving data and a logical address stored in the medium in accordance with the read instruction from the storage device,
            comparing the logical address included in the write request to the logical address received from the storage device, and
            sending an instruction to cause the storage device to write the address translation information stored in the medium into the memory when the logical address received from the storage device is different from the logical address included in the write request.

2. The storage system according to claim 1, wherein the procedure executed by the processor in the storage control device further includes sending the write instruction to the storage device corresponding to the write request received by the host.

3. The storage system according to claim 1, wherein the storage control device controls a plurality of storage devices, and wherein the storage control device controls a technique of Redundant Arrays of Independent Disks which is constructed by the plurality of storage devices.

4. The storage system according to claim 1, wherein the storage control device includes a memory for storing flag information indicating whether or not the address translation information is rewrite.

5. A method for controlling a storage control device to control a storage device including a medium to store data, a logical address, address translation information used to perform translation between a physical address indicating a physical position on the medium and a logical address, a memory to store the address translation information that is read from the medium, and a processor to execute a procedure, the procedure including translating a logical address, included in a read instruction from the storage control device, into a physical address by referring to the address translation information stored in the memory and reading data and a logical address stored in the medium from a position indicated by the translated physical address, upon receiving the read instruction from the storage control device, sending the data and the logical address read from the medium to the storage control device, and translating a logical address, included in a write instruction from the storage control device, into a physical address by referring to the address translation information stored in the memory, and writing the logical address and data, included in the write instruction, in a position indicated by the physical address in the medium, upon receiving the write instruction from the storage control device, the method comprising:
    receiving a write request including a logical address from a host;
    sending a read instruction including the logical address of the write request to the storage device;
    receiving data and a logical address stored in the medium in accordance with the read instruction from the storage device
    comparing the logical address included in the write request to the logical address received from the storage device; and
    sending an instruction to cause the storage device to write the address translation information stored in the medium into the memory when the logical address received from the storage device is different from the logical address included in the write request.

6. The method according to claim 5, further comprising sending the write instruction to the storage device corresponding to the received write request.

7. The method according to claim 5, wherein the storage control device controls a plurality of storage devices, and wherein the storage control device controls a technique of Redundant Arrays of Independent Disks which is constructed by the plurality of storage devices.

8. The method according to claim 5, wherein the storage control device storing flag information indicating whether or not the address translation information is rewrite, and further comprising changing flag information when the address translation information is read from the medium.

\* \* \* \* \*